May 22, 1962 — L. PÉRAS — 3,035,674
SYNCHROMESH UNITS
Filed Oct. 15, 1959 — 2 Sheets-Sheet 1

INVENTOR
Lucien Péras
BY Stevens, Davis, Miller & Mosher
ATTORNEYS

INVENTOR
Lucien Peras

United States Patent Office 3,035,674
Patented May 22, 1962

3,035,674
SYNCHROMESH UNITS
Lucien Péras, Billancourt, France, assignor to Regie Nationale des Usines Renault, Billancourt, France
Filed Oct. 15, 1959, Ser. No. 846,719
Claims priority, application France Oct. 24, 1958
5 Claims. (Cl. 192—53)

This invention relates in general to synchromesh units of gearboxes or gear couplings, and has specific reference to synchromeshing devices of the type comprising a movable synchronizing cone disposed between a sliding member and the pinion or pinions with which the sliding member is to be rotatably locked by means of dogs or teeth.

More specifically, this invention is concerned with a particularly simple and compact synchromesh unit construction characterized essentially by a reduced axial dimension, a feature most appreciable in the case of gearboxes incorporating—as in the great majority of gearbox constructions—more than one synchromeshing device on the same shaft. Moreover, this construction also permits a reduction in its radial dimension, so that heavier, more rigid shafts can be used to prevent springing and subsequent untrue tooth mesh.

To this end, in a synchroniser according to this invention, the synchronizing cone comprises a tapered friction surface adapted to co-act with a corresponding tapered friction surface formed on the sliding member, and surrounds the dogs of the corresponding pinion with which it is rotatably locked by means of inner radial lugs normally positioned at the entrance of wider axial notches formed on the dog hub portion of the pinion, said lugs having furthermore an extension disposed internally of the cone and obliquely toward the hub of the sliding member, which are normally urged by a circular cone-return spring for engagement with the bottom of a groove formed in said sliding member, said spring being carried by the pinion and co-acting with the inner cam forming faces of said lugs.

In this construction, the movable synchronizing cone is preferably a male cone, the peripheral outer friction surface of which engages the corresponding inner or female cone formed in the sliding member.

The advantages arising from this improved construction will appear more clearly as the following description proceeds with reference to the accompanying drawings forming part of this specification and illustrating diagrammatically by way of example a typical form of embodiment of a synchronizer constructed in accordance with the teachings of this invention. In the drawings.

Figure 1:
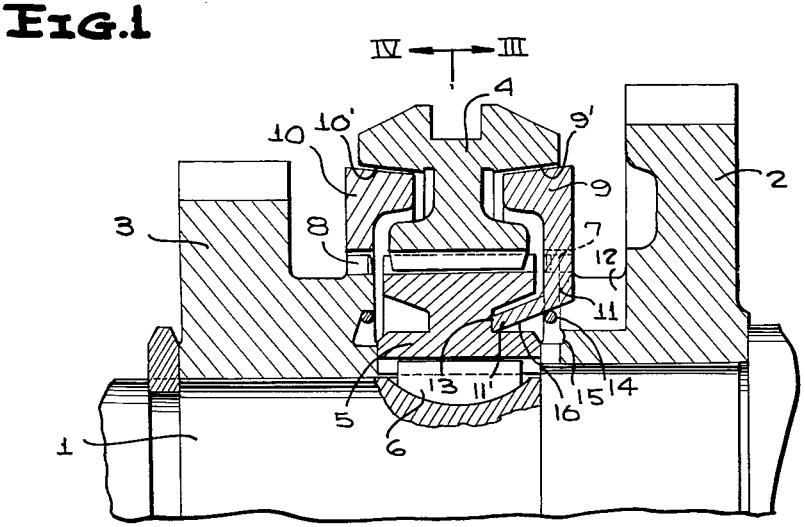
FIGURE 1 is a half-section taken across the axis of a synchromesh unit according to the invention, shown in its inoperative position.

According to the conventional gearbox construction, the synchronizing device illustrated in FIG. 1 comprises a pair of pinions 2, 3 corresponding to two different gear ratios which are mounted for loose rotation on a common shaft 1, a sliding member 4 being disposed between the pinions 2, 3 and mounted on splines formed on the outer periphery of a hub 5 keyed at 6 on the shaft 1.

This sliding member 4 is adapted to be brought into locking or meshing engagement through its inner dogs or teeth with either of corresponding dogs or teeth 7, 8 carried by the pinions 2, 3 respectively. To ensure a proper engagement between the sliding member and the selected pinion a movable synchronizing cone is disposed between the sliding member 4 and each pinion, in the form of cone clutches 9, 10 in the embodiment shown.

The invention consists of an arrangement of these various elements which is characterized by reduced overall dimensions, a relatively simple construction and a reliable operation.

In this arrangement, each movable cone consists of a male cone having a tapered friction surface $9^1$, $10^1$ adapted to co-act with a corresponding female tapered friction surface formed internally of the sliding member 4. Moreover, each cone surrounds the dogs or teeth of the relevant pinion and is formed with inner radial lugs 11 which, in the inoperative position of the synchromesh unit, register with the entrance of wider axial notches 12 formed on the dog-carrying hub of the pinion. In addition, these lugs 11 are formed with inner extensions $11^1$ directed toward the hub 5 of the sliding member, these extensions engaging a groove 13 and being normally urged against the bottom of this groove in the inoperative position of the synchronizer. The cone assembly is urged to this position by a single circular spring or circlip 14 mounted in prestressed condition in a lateral groove 15 formed in the dog hub of the pinion; this spring engages the inner faces 16 of the lug extensions $11^1$ which are formed to this end with a convenient taper toward the cone axis.

Figure 3:
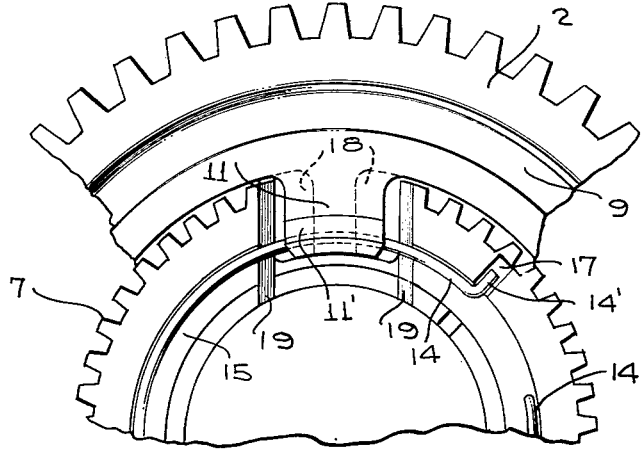
FIGURE 3 is a fragmentary front view of a pinion, of the corresponding synchronizing cone and of its return spring, the view being taken in the direction of the arrow III of FIG. 1.
Figure 4:
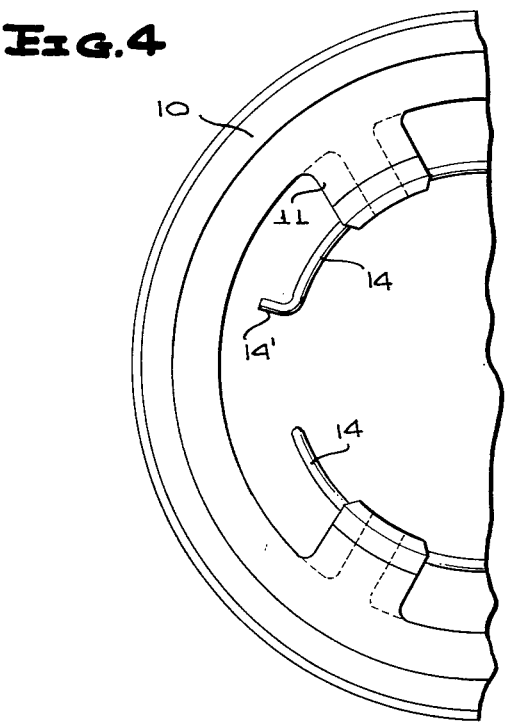
FIGURE 4 is a half front view of a synchronizing cone with its return spring, the view being taken in the direction of the arrow IV of FIG. 1.

This spring 14 is held against rotation by an end pin $14^1$ formed by bending outward one end of the spring wire constituting the spring 14, this pen engaging a radial notch 17 formed in the pinion (see FIG. 3).

In the inoperative position, each cone is thus centered radially by the extensions $11^1$ of lugs 11 which engage the groove 13 of hub 5, and if desired only a moderate clearance may be provided between the male and the female tapered friction surfaces of each cone and the sliding member 4.

Figure 5:
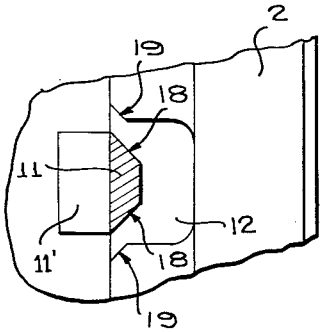
FIGURE 5 is a detail view showing the permissible angular play of a cone lug in the corresponding axial notch of a pinion.

On the other hand, as evidenced by FIG. 5, the lugs 11 of the cone clutch members have their pinion-facing sides edges bevelled at 18, the side edges of the pinion notches 12 being also bevelled as shown at 19.

Other descriptive remarks will occur during and after the following description of the mode of operation of the synchronizer according to this invention.

During the operation of the gearbox, when the sliding member 4 is in its intermediate or inoperative position (FIG. 1), the relative speeds of the shaft 1 and of the pinion to be driven are such that the lugs 11 of the relevant cone engage one side 19 of the corresponding notches 12 with their registering bevelled faces 18, due to the frictional engagement obtaining between the end portions of the lug extensions $11^1$ and the bottom of the groove 13 in hub 5. The synchronizer is thus "preset."

The actuation of the sliding member 4 causes the cone surface thereof to engage the corresponding surface of the movable cone, thus reinforcing the initial driving effort of this cone, so that the bevelled faces 18 will engage with a greater force the registering bevels 19 in the same direction as before.

As the axial thrust applied to the sliding member 4 increases, the synchronizing effort increases accordingly since the relative engagement between the abutting surfaces 18, 19 of the cone and pinion prevents any movement of translation from taking place, as in all synchromesh devices of the locking type.

Figure 2:
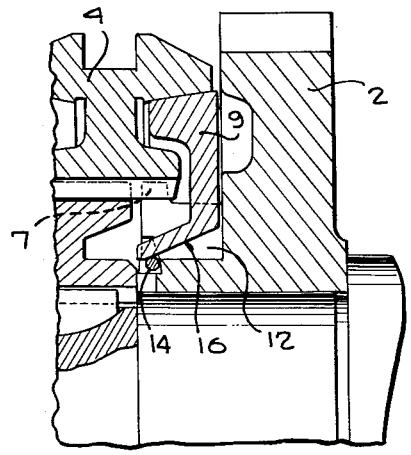
FIGURE 2 is a fragmentary view of the same synchromesh unit but shown in its dog-meshing position with one of the pinions.

This locking action is removed when the synchronizing torque generated on the tapered friction surfaces cancels itself, that is, when the speeds of the dogs to be brought in meshing engagement become equal; then, the cam faces 18 and bevels 19 slide on one another and will permit the relative axial movement of the movable cone and sliding member toward the meshing position corresponding to the full engagement of the selected speed ratio (FIG. 2).

During this axial movement of the sliding member 4, the movable synchronizing cone is centered continuously by the corresponding taper of the sliding member. When it is desired to disconnect the previously engaged speed, the movable cone, constantly urged toward the hub 5 by the resilient pressure exerted by the circular spring 14 on the cam faces 16 of lugs 11$^1$, moves bodily with the sliding member as it travels back to its initial or inoperative position in which the lugs 11$^1$ engage the bottom of the groove 13 formed in the splined hub 5.

Upon completion of the return movement of the sliding member 4 to its intermediate position the friction surfaces thereof and those of the movable cone involved in the preceding operation are separated and as the assembly has thus recovered its initial condition, the frictional engagement between the lug extensions and the hub 5 causes again the bevelled faces 18, 19 to engage one another and therefore the synchronizer to be reset.

Considering FIG. 1 and by virtue of the arrangements set forth hereabove in connection with the arraying of each movable cone between the sliding member 4 and the relevant pinion, this cone being preferably a male cone engaging a female cone formed in the sliding member, it is clear, on the one hand, that a moderate axial travel of the sliding member will be sufficient for causing the dog to mesh with a pinion, while utilizing an efficient synchronizing method, and on the other hand that the pinion itself can be located at a shorter distance relative to the sliding member, thus reducing considerably the axial or longitudinal dimension of the assembly in comparison with conventional devices.

This reduction in the axial dimensions of the assembly is also due to the very simple arrangement of the lugs 11 and their extensions 11$^1$ engaging the groove 13 in the hub of the sliding member under the resilient force of a single return spring 14. As explained hereabove, this arrangement also permits of properly centering the cone in an axial return position in which the synchronizer is reset. Moreover, it will be seen that by positioning the return spring 14 in a groove 15 having an oblique bottom wall directed toward the axis, as in the example illustrated herein, the assembly and removal of this spring are facilitated, and in addition the length of the lug extensions 11$^1$ can be reduced in the axial direction, as will be seen by comparing FIGS. 1 and 2. Again, in this construction, the use of a circular return spring engaging directly the cam faces of the synchronizing cone makes it possible to use a heavier shaft for a given radial over-all dimension, in comparison with at least the devices in which the cones are returned by push members or like radially-disposed members.

Although the above description and the accompanying drawings refer essentially to a single form of embodiment of the device constituting the subject-matter of this invention, it will be readily understood by anybody conversant with the art that many modifications and alterations may be brought thereto without departing from the spirit and scope of the invention as set forth in the appended claims.

I claim:
1. A synchromesh unit, comprising a rotary shaft, a pair of pinions loosely mounted on the shaft, a sliding member having a hub keyed on the shaft between the pinions and slidable on the shaft relative to the pinions, said sliding member and pinions having inter-engaging teeth, a movable synchronizing cone interposed between the pinions and the sliding member, said cones and the sliding member having inter-engaging friction surfaces, each cone being disposed around the teeth of its associated pinion and each cone having inner radial lugs, each pinion having a hub provided with axial notches in which the lugs are located to lock the cone against rotation relative to its associated pinion, said lugs having bevelled side edges and said notches having bevelled side edges to receive the lugs, said lugs having inner oblique extensions directed toward the hub of the sliding member, said hub having opposing sides formed with annular grooves, each groove being open on one side and receiving the extensions of the lugs thus insuring the centering of the cone and resilient radially expansive means being disposed between each pinion and the extensions of the lugs of each cone whereby the extensions are urged to abut axially against the bottom of said groove in a position in which the cone is normally held from the corresponding frictional surface carried by the sliding member.

2. A synchromesh unit according to claim 1, wherein said resilient radially expansive means includes a circular spring mounted in a pre-stressed condition in a lateral groove of each pinion and said lugs having inner oblique faces with which the spring co-acts.

3. Synchromesh unit according to claim 1, wherein each movable synchronizing cone is a male cone having a friction surface on its periphery which surface engages a corresponding female tapered friction surface formed in the sliding member.

4. Synchromesh unit according to claim 1, wherein said resilient means includes a circular return spring associated with each cone and fitted in a lateral groove formed in each pinion, said groove having a wall directed obliquely toward the pinion axis.

5. A synchromesh unit comprising a rotary shaft, a pinion loosely mounted on the shaft, a sliding member having a hub keyed on the shaft and slidable on the shaft relative to the pinion, said sliding member and pinion having inter-engaging teeth, a movable synchronizing cone interposed between the pinion and the sliding member, said cone and the sliding member having inter-engaging friction surfaces, said cone being disposed around the teeth of the pinion and having inner radial lugs, said pinion having a hub provided with axial notches in which the lugs are located to lock the cone against rotation relative to the pinion, said lugs having bevelled side edges and said notches having bevelled side edges to receive the lugs, said lugs having inner oblique extensions directed toward the hub of the sliding member, said hub having a side formed with an annular groove, said groove being open on one side and receiving the extensions of the lugs thus insuring the centering of the cone and resilient radially expansive means being disposed between the pinion and the extensions of the lugs of the cone whereby the extensions are urged to abut axially against the bottom of said groove in a position in which the cone is normally held from the corresponding frictional surface carried by the sliding member.

References Cited in the file of this patent
UNITED STATES PATENTS

| | | |
|---|---|---|
| 1,997,056 | Griswold | Apr. 9, 1935 |
| 2,131,201 | Tyler | Sept. 27, 1938 |
| 2,470,208 | Avila | May 17, 1949 |